(12) United States Patent
Veerasamy et al.

(10) Patent No.: US 6,692,600 B2
(45) Date of Patent: Feb. 17, 2004

(54) VIG EVACUATION WITH PLASMA EXCITATION

(75) Inventors: Vijayen S. Veerasamy, Farmington Hills, MI (US); Anthony V. Longobardo, Howell, MI (US); John P. Hogan, Dearborn, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 154 days.

(21) Appl. No.: 09/951,771

(22) Filed: Sep. 14, 2001

(65) Prior Publication Data

US 2003/0051436 A1 Mar. 20, 2003

(51) Int. Cl.$^7$ .......................... C03C 27/00; E06B 3/24; B29C 65/00; B29C 31/00; H05H 1/26

(52) U.S. Cl. .................... 156/109; 156/274.2; 156/286; 264/483

(58) Field of Search .......................... 264/483; 156/107, 156/109, 272.2, 273.3, 274.2, 275.1, 285, 286; 315/111.21, 111.71; 204/164, 170, 557

(56) References Cited

U.S. PATENT DOCUMENTS

| | | | |
|---|---|---|---|
| 3,914,000 A | | 10/1975 | Beckerman et al. |
| 3,998,510 A | * | 12/1976 | Salisbury ..................... 316/17 |
| 5,190,703 A | * | 3/1993 | Rose et al. .................. 264/22 |
| 5,198,723 A | * | 3/1993 | Parker ......................... 313/493 |
| 5,657,607 A | | 8/1997 | Collins et al. |
| 5,807,526 A | * | 9/1998 | Miljevic ....................... 422/174 |
| 5,834,891 A | * | 11/1998 | Novich ......................... 313/495 |
| 5,855,638 A | | 1/1999 | Demars |
| 5,891,536 A | | 4/1999 | Collins et al. |
| 5,897,927 A | | 4/1999 | Tsai et al. |
| 5,964,630 A | * | 10/1999 | Slusarczuk et al. ............ 445/25 |
| 6,062,163 A | * | 5/2000 | Patrick et al. ............ 118/723 I |
| 6,261,652 B1 | | 7/2001 | Poix et al. |

* cited by examiner

Primary Examiner—Donald J. Loney
(74) Attorney, Agent, or Firm—Nixon & Vanderhye P.C.

(57) ABSTRACT

A thermally insulating panel (e.g., vacuum IG window unit) includes first and second opposing substrates spaced apart from one another by a plurality of spacers. A low pressure space is defined between the substrates, and is hermetically sealed off by at least one edge seal. During evacuation of the space, a plasma is ignited within the space in order to reduce the time needed to evacuate the space down to the desired low pressure.

28 Claims, 6 Drawing Sheets

VIG EVACUATION WITH PLASMA EXCITATION

This invention relates to a vacuum insulating glass (IG) unit, and a method of making the same. More particularly, this invention relates to a method of plasma enhanced evacuation of the internal cavity of a vacuum IG unit or thermally insulating panel.

BACKGROUND OF THE INVENTION

Vacuum IG units are known in the art. For example, see U.S. Pat. Nos. 5,664,395; 5,657,607; 5,897,927; 5,902,652; and 6,261,652, the disclosures of which are all hereby incorporated herein by reference.

Figure 1:
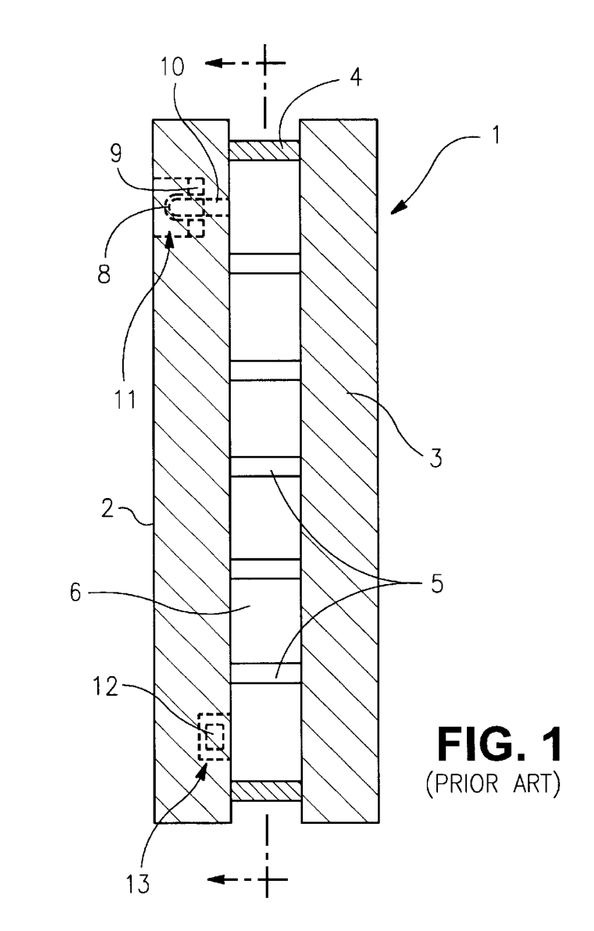
FIG. 1 is a prior art cross-sectional view of a conventional vacuum IG unit.
Figure 2:
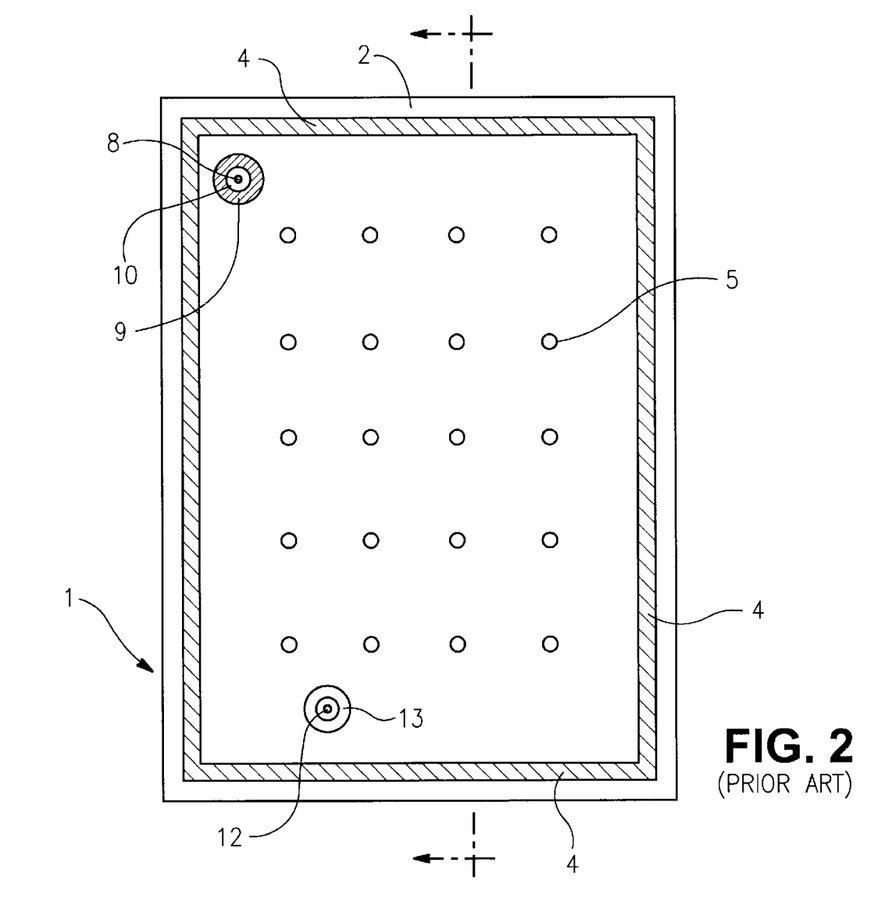
FIG. 2 is a prior art top plan view of the bottom substrate, edge seal, and spacers of the FIG. 1 vacuum IG unit taken along the section line illustrated in FIG. 1.

Prior art FIGS. 1–2 illustrate a conventional vacuum IG unit. IG unit 1 includes a pair of spaced apart glass substrates 2 and 3 which enclose an evacuated or low pressure space/cavity 6 therebetween. Glass sheets/substrates 2 and 3 are interconnected by peripheral or edge seal 4 of fused solder glass. An array of support pillars or spacers 5 are provided between the substrates in order to space substrates 2, 3 from one another in order to form the space/cavity 6.

In order to evacuate the space/cavity 6, pump out tube 8 is hermetically sealed by solder glass 9 to an aperture or hole 10 which passes from an interior surface of substrate 2 to the bottom of recess 11 formed in the exterior face of substrate 2. A vacuum pump (not shown in FIGS. 1–2) is attached to pump out tube 8, so that the interior cavity 6 between substrates 2 and 3 can be evacuated (i.e., pumped out) to create low pressure in cavity/space 6. Following evacuation, tube 8 may be melted to seal the vacuum. Optionally, a chemical getter 12 may be included within recess 13.

Interior cavity 6 of vacuum IG units are typically evacuated down to a pressure below $10^{-3}$ Torr, and most preferably to a pressure below about $10^{-4}$ Torr of atmospheric pressure. Unfortunately, it typically takes twelve minutes or more in order to evacuate cavity 6 to such a low pressure. This lengthy period of time is sometimes undesirable, as it increases the time of production and ties up the operation of valuable capital-intensive machinery.

In view of the above, it will be appreciated by those skilled in the art that there exists a need for a method of evacuating a vacuum IG unit, which takes less time. It is a purpose of certain embodiments of this invention to fulfill this need, and/or other needs which will become apparent to those skilled in the art as a result of the instant disclosure.

SUMMARY OF THE INVENTION

An object of this invention is to provide a method of evacuating a thermally insulating panel such as a vacuum insulating glass (IG) unit, where it takes no more than twelve minutes to evacuate the internal cavity down to a pressure of about $5 \times 10^{-4}$ or less.

Another object of this invention is to ignite a plasma within the internal cavity of a thermally insulating panel (e.g., vacuum IG unit) during the evacuation process, in order to speed up and/or improve the process of evacuation.

Another object of this invention is to inject a gas (e.g., argon, nitrogen, oxygen, hydrogen, etc.) into the internal cavity of a thermally insulating panel, and thereafter inductively ignite a plasma within the cavity by at least partially ionizing the gas. It has been found that the ignition of this plasma results in a quicker and/or more efficient evacuation of the cavity. Moreover, it has been found that the ignition of such a plasma during the evacuation process results in a final vacuum IG unit which tends to be more stable upon exposure to ultraviolet (UV) light.

Another object of this invention is to ignite a plasma within the cavity of a thermally insulating panel during an evacuation process, by utilizing an electromagnetic wave generating coil located outside of the cavity.

Another object of this invention is to fulfill one or more of the above-listed objects and/or needs.

Certain example embodiments of this invention fulfill one or more of the above-listed objects and/or needs by providing a method of making a thermally insulating panel, the method comprising:

providing a plurality of spacers between first and second substrates in order to space the substrates from one another;

forming a seal located at least partially between the substrates so as to seal off a space between the substrates; and causing a plasma to be present in at least a portion of the space between the substrates during a process of evacuating the space.

DETAILED DESCRIPTION OF CERTAIN EXAMPLE EMBODIMENTS OF THIS INVENTION

Referring now more particularly to the accompanying drawings in which like reference numerals generally indicate like parts throughout the several views.

Certain embodiments of this invention relate to a method of making a thermally insulating panel such as a vacuum IG unit. The panel or IG unit includes an array of spacers located between opposing substrates, and an edge seal hermetically sealing opposing peripheral edge portions of the opposing substrates. "Peripheral" and "edge" seals herein do not mean that the seal(s) is/are located at the absolute periphery or edge of the unit, but instead mean that the seal is at least partially located at or near (e.g., within about two inches) an edge of at least one substrate of the unit.

Certain embodiments of this invention utilize the ignition of a plasma within the internal cavity or space of a vacuum IG unit, before and/or during the evacuation process thereof. As will be explained herein, it has unexpectedly been found that the ignition of a plasma within the internal cavity or space quickens the evacuation process so that it can be completed in less time. Additionally, it is believed that the plasma ignited within the cavity functions to help clean interior cavity surfaces so that contaminants removed from such surfaces may be more quickly removed from the cavity via the pump-out or evacuation process. The plasma may be ignited within the cavity via a coil or any other suitable plasma igniting device, which is preferably located at least partially outside of the cavity.

An example process includes igniting a plasma within the space/cavity of the unit between the substrates within a range of optimal pressure, thereby creating an internal source of ultraviolet (UV) emissions which may accelerate outgassing under vacuum. The plasma may be ignited either after or while gas is being injected into the cavity/space. The plasma provides energetic ions in contact with the internal surfaces (e.g., internal substrate surfaces defining the space/cavity) of the unit. Then, the space/cavity is evacuated. This evacuation may be done either while the plasma is still being ignited, or after it has expired. The result is an effectively cleaned vacuum IG unit, with degassed interior surfaces. Moreover, pumping-out to high vacuum (i.e., low pressure) has been found to proceed more quickly compared to pumping-out without the plasma treatment.

Figure 3:
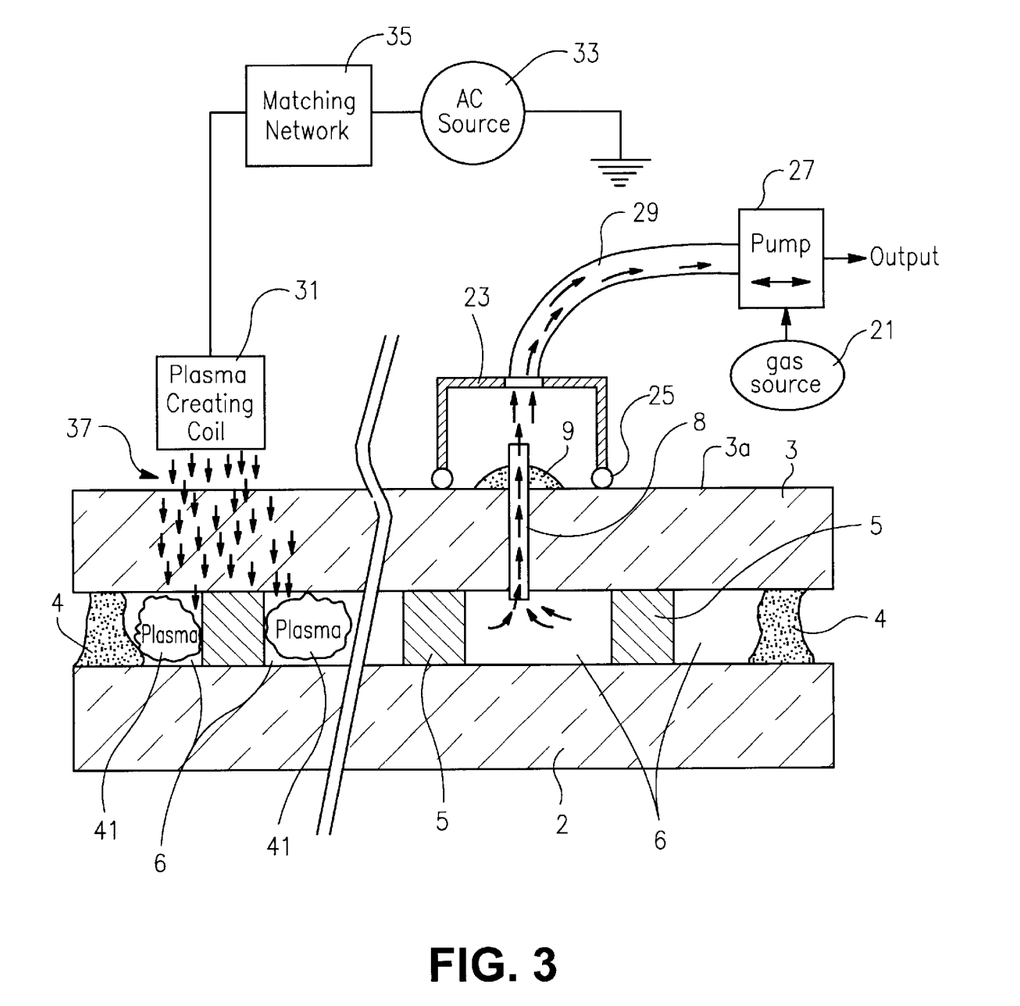
FIG. 3 is a cross-sectional view of a vacuum IG unit being manufactured according to an embodiment of this invention.

FIG. 1 is a cross-sectional view of a vacuum IG unit being manufactured according to an embodiment of this invention. Because interior cavity or space 6 between the opposing substrates 2, 3 is at a pressure lower than atmospheric in general following the process of manufacture, this type of panel is often referred to as a vacuum insulating glass (IG) unit having low pressure space 6. The vacuum IG unit or panel includes first glass substrate 2, second glass substrate 3, low pressure or evacuated space/cavity 6 provided between the substrates, spacers/pillars 5 for spacing substrates 2 and 3 from one another and supporting them, pump out tube 8 (of metal or glass) for enabling space 6 to be evacuated and/or for enabling purging gas to be pumped into space 6, seal 9 (e.g., of or including solder glass for hermetically sealing tube 8 to the exterior surface 3a of substrate 3, and peripheral or edge seal(s) 4 that hermetically seals low pressure space 6 between substrates 2, 3. Hermetic edge seal 4 substantially prevents any significant amount of air from entering space 6, and substantially maintains the vacuum therein created during the pump-out process. Seal 4 in certain embodiments of this invention may be located in approximately the same location as edge seal 4 shown in FIGS. 1–2. Any other suitable location is possible so long as the low pressure space 6 is sealed off between the substrates. Substrates 2, 3 may be thermally tempered glass, annealed glass, or any other glass in different embodiments of this invention.

In certain embodiments of this invention, substrates 2 and 3 may be approximately the same size. However, in other embodiments, one glass substrate 2 may be larger in size than the other glass substrate 3 in order to provide an approximately L-shaped step proximate an edge of the vacuum IG unit.

Vacuum IG units according to different embodiments of this invention may be used as residential or commercial windows. The evacuation of space 6 eliminates or reduces heat transport between substrates 2, 3 due to gaseous conduction and convection. In addition, radiative heat transport between substrates 2 and 3 can be reduced to a rather low level by providing an optional low emissivity (low-E) coating (not shown) on the internal surface of one or both substrates 2, 3. Such low-E coatings are typically edge deleted under edge seals 4, but need not be in certain embodiments of this invention. High levels of thermal insulation can thus be achieved.

In certain embodiments of this invention, the pressure in space 6 is reduced by way of an evacuation process to a level below about $10^{-2}$ Torr, more preferably below about $10^{-3}$ Torr, and most preferably below about $5\times10^{-4}$ Torr. To maintain such low pressures below atmospheric pressure, substrates 2 and 3 are often hermetically sealed to one another by edge seal 4.

Still referring to FIG. 3, an array of small, high strength support spacers 5 is provided between substrates 2, 3 in order to maintain separation of the approximately parallel substrates against atmospheric pressure. It is often desirable for spacers 5 to be sufficiently small so that they are visibly unobtrusive. In certain embodiments, each spacer 5 may have a height of from about 0.1 to 1.0 mm, more preferably from about 0.2 to 0.4 mm. Spacers 5 may be made of solder glass, glass, ceramic, metal, polymer, or any other suitable material in different embodiments of this invention. Spacers 5 may be cylindrical in shape, round in shape, spherical in shape, dime-shaped, or any other suitable shape in different embodiments of this invention.

According to certain embodiments of this invention, the glass used for substrates 2 and 3 may be soda lime silica glass. However, other types of glass, colored or clear, may also be used (e.g., borosilicate glass). Glass substrates 2, 3 may be of from about 1–6 mm thick in certain embodiments, preferably from about 3–5 mm thick each. However, when tempered, the glass substrates may be thinner. In alternative embodiments of this invention, it is possible to utilize plastic substrates 2, 3.

Edge seal 4 may be made of any suitable material, including but not limited to solder glass in different embodiments of this invention. In certain embodiments, edge seal 4 may be cured using microwave energy or any other suitable heat source.

In the process of manufacture, substrate 2 is provided. Then, spacers 5 are located on the bottom substrate 2 and top substrate 3 is brought down over the spacers and bottom substrate. Edge seal material, have been provided on the substrate(s), is then cured so as to form edge seal 4 in order to seal off internal cavity of space 6. Thereafter, it is time to evacuate the internal cavity/space 6.

Figure 4:
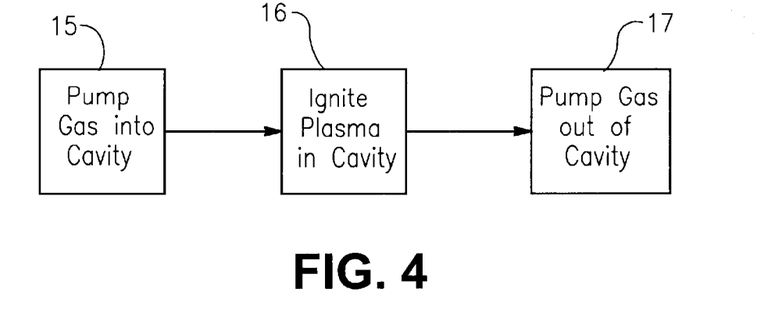
FIG. 4 is a flowchart illustrating certain general steps taken in accordance with an example embodiment of this invention during the manufacture of the FIG. 3 vacuum IG unit.

Referring to FIGS. 3–4, the evacuation process first includes pumping a gas (e.g., nitrogen, argon, oxygen, hydrogen, or the like) into cavity 6 (see step 15 in FIG. 4). Pumping of such gas into the cavity/space 6 is often referred to as purging or backfilling the cavity/space 6 with a gas. After the gas from source 21 has been pumped into the space/cavity 6 via pump 27, a plasma is ignited in the cavity 6 by at least partially ionizing at least part of the gas (see step 16 in FIG. 4). For example, the plasma may ignited when the cavity is at a pressure of from 0.1 to 200 Torr, more preferably from about 1 to 100 Torr, and most preferably from about 1 to 50 Torr. After the plasma has been ignited, gas is pumped out of the cavity 6 during the evacuation process so as to lower pressure in the cavity 6 to the aforesaid low pressure(s) (see step 17 in FIG. 4).

For a more detailed explanation, FIG. 3 is referred to. As shown in FIG. 3, pump-out tube 8 is mounted in substrate 3. The upper portion of pump-out tube 8 is hermetically sealed to the exterior surface 3a of substrate 3 by solder glass seal 9. Housing 23, mounted to the exterior surface 3a of substrate 3 by O-ring 25, functions to seal off an area above the outer end of pump-out tube 8. An aperture in housing 23 communicates with pump 27 via communication line or tube 29. Pump 27 is bi-directional, and may function to either pump gas from source 21 into cavity 6 by way of tube 8, or may function to evacuate cavity 6 via tube 8.

Still referring to FIG. 3, plasma inducing coil 31 is located outside of cavity 6 adjacent the exterior surface 3a of substrate 3. Coil 31 is driven via alternating current (AC) source 33 and matching network 35. Coil 31 may be a tesla coil in certain embodiments of this invention, but may also be other types of coils or any other suitable device for igniting a plasma in other embodiments. When a Tesla coil 31 is used, it is driven with current/voltage so as to cause the coil 31 to generate electromagnetic waves 37 to be directed through substrate 3 and into cavity 6. These electromagnetic waves 37 generated by coil 31 ignite a plasma 41 within the gas-inclusive cavity 6 (i.e., the plasma is inductively ignited). Plasma 41 is ignited by at least partially ionizing gas which has been pumped into cavity 6 from source 21 during the backfill/purge process.

Reference is now made to the examples set forth below which illustrate how the ignition of plasma 41 within cavity 6 unexpectedly enables the evacuation time to be significantly reduced.

EXAMPLES

Six (6) different examples were carried out in order to illustrate the advantage(s) of igniting plasma 41 within cavity 6. Three comparative examples (comparative Examples 1–3) were performed without igniting a plasma in cavity 6, and three corresponding examples utilizing the same gases were carried out with ignition of plasma 41 in cavity 6 (Examples 4–6). It will be shown below that the examples in which plasma 41 was ignited in the space/cavity 6 (i.e., Examples 4–6) had evacuation times much less than the comparative examples where no plasma was ignited. In all six examples, tube 8 was 6 mm in length, with an inner diameter of 1.65 mm.

Figure 5:
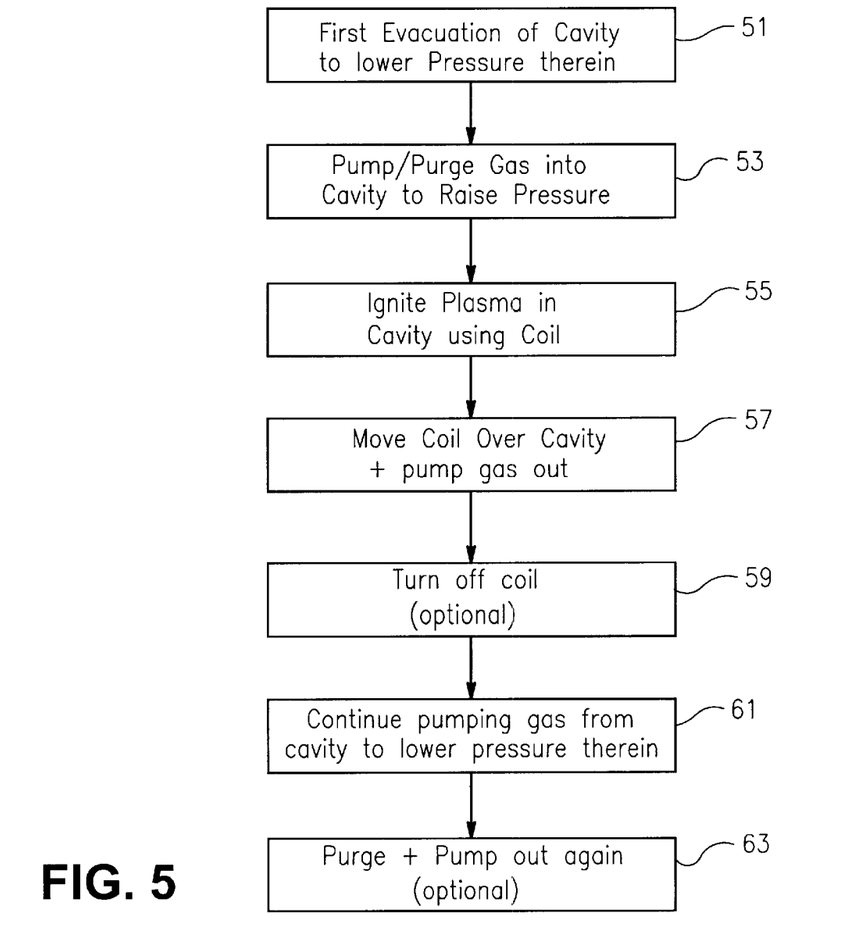
FIG. 5 is a flowchart illustrating in detail certain steps taken in accordance with an example embodiment of this invention during the manufacture of the FIG. 3 vacuum IG unit.
Figure 6:
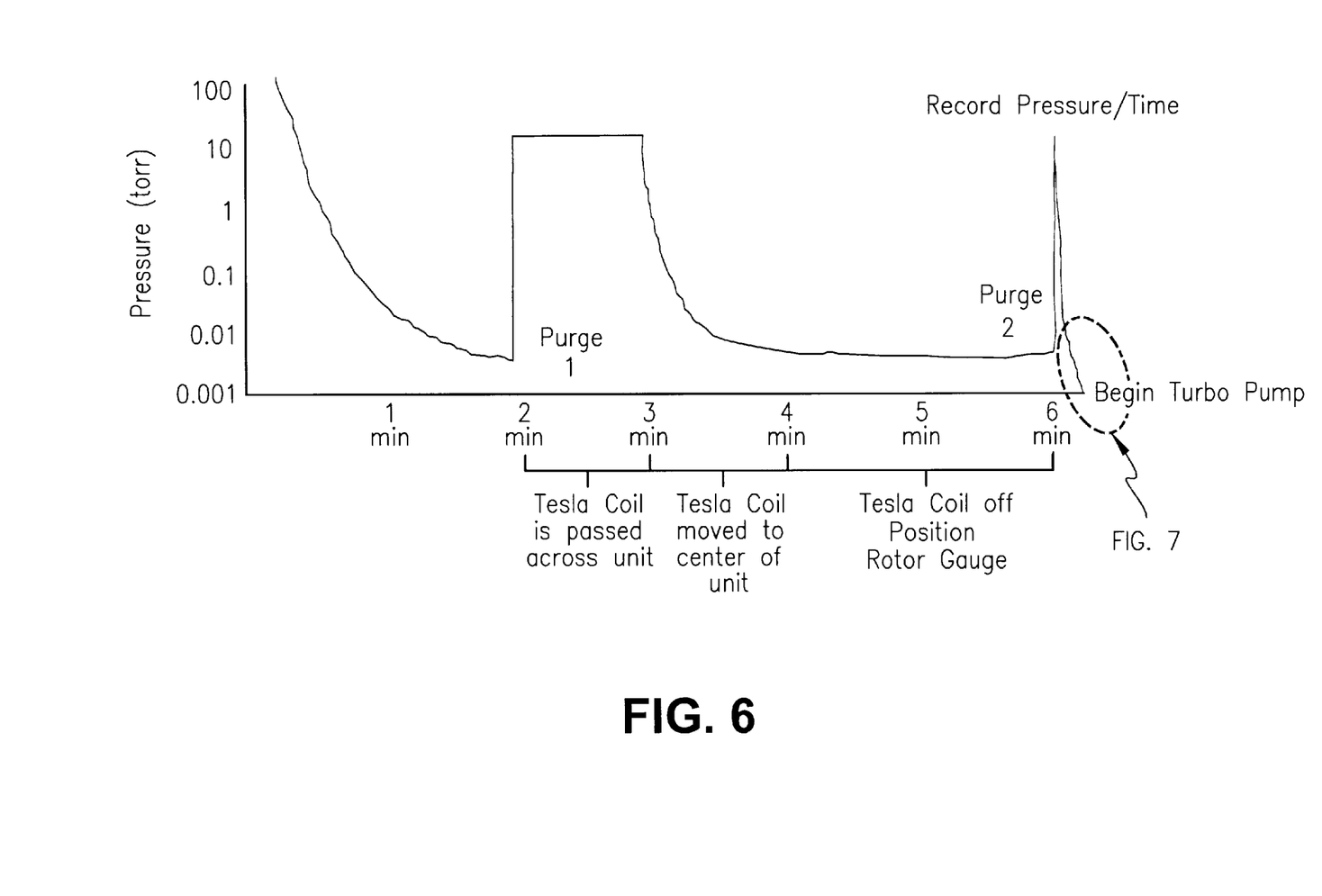
FIG. 6 is a pressure (Torr) vs. time (minutes) graph illustrating how vacuum IG units were evacuated in six different examples presented herein.
Figure 7:
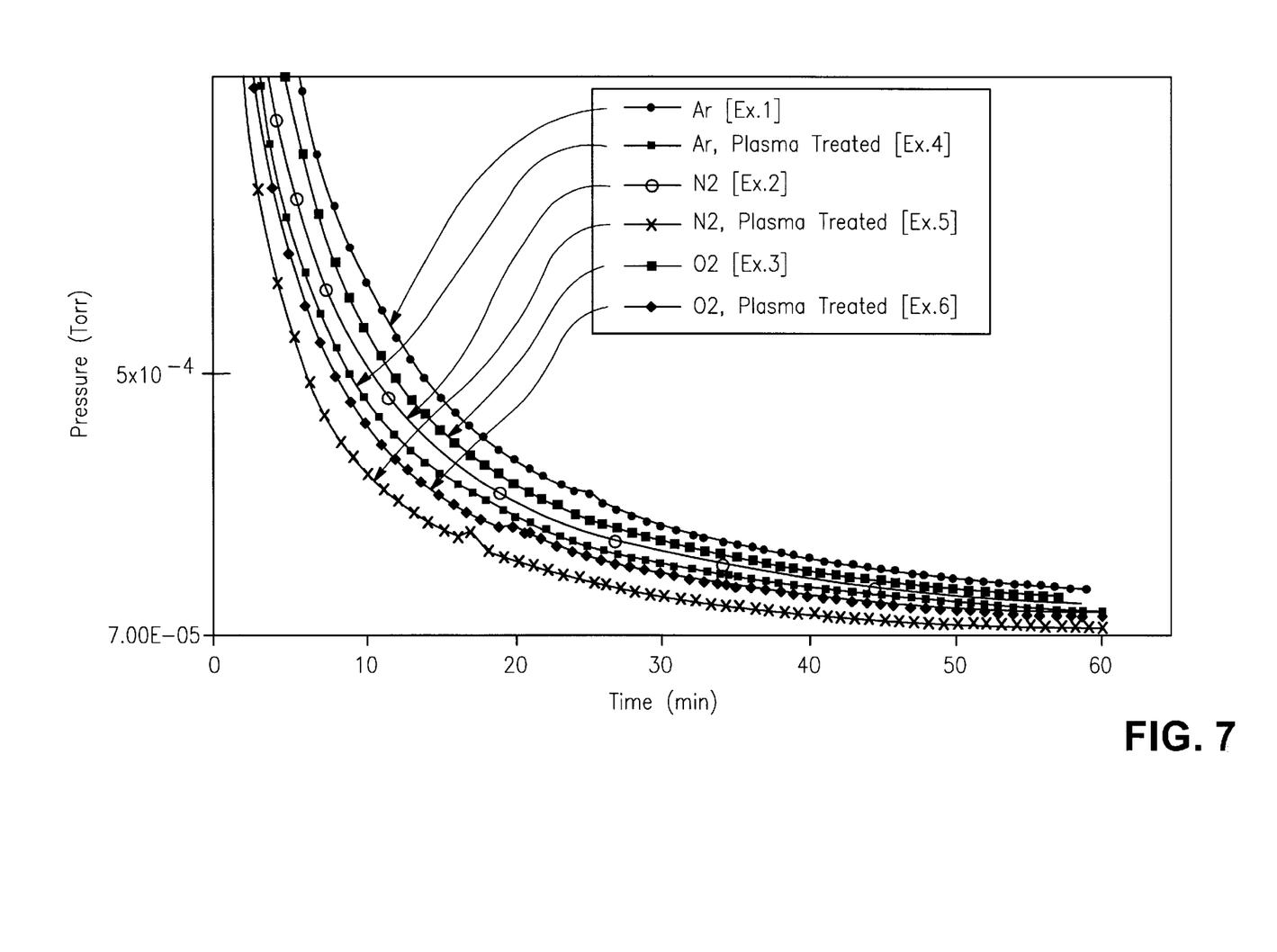
FIG. 7 is a pressure (Torr.) vs. time (minutes) graph of the end portion of the FIG. 6 graph, illustrating evacuation times associated with the six examples presented herein.
Figure 8:
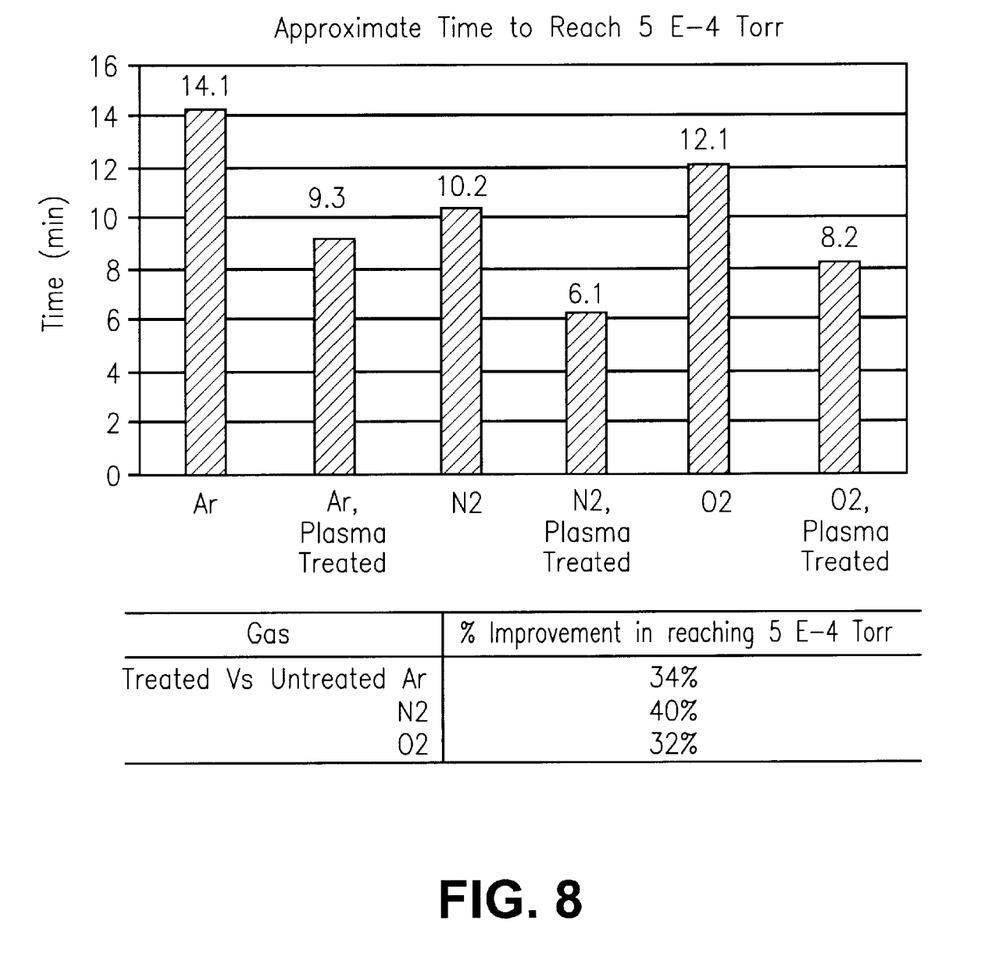
FIG. 8 is a comparative graph illustrating the time taken in order to evacuate a vacuum IG unit to a pressure of $5 \times 10^{-4}$ Torr according to the six examples illustrated in FIGS. 6–7.

FIG. 5 illustrates certain steps carried out in the three examples in which plasma was ignited (i.e., Examples 4–6), while FIGS. 6–8 are also illustrative of the examples.

Examples 1–3 were performed for comparative purposes only. In Example 1, cavity 6 was twice purged with argon (Ar) gas and thereafter evacuated to the pressures shown in FIGS. 7–8. In Example 2, cavity 6 was twice purged with nitrogen (N) gas, and thereafter evacuated to the pressure(s) shown in FIGS. 7–8. In Example 3, cavity 6 was twice purged with oxygen (O) gas, and thereafter evacuated to the pressure(s) shown in FIGS. 7–8. No plasma was ignited in any of Examples 1–3. FIG. 6 illustrates the first and second gas purgings, and the final evacuation carried out in each of Examples 1–3 (except that no plasma was ignited and thus no coil used). FIG. 7 focuses on the evacuation time frame of the first three examples, after about the 4–5 minute mark.

As illustrated in FIG. 8, in Example 1 where only Ar gas was used (no plasma), it took 14.1 minutes to evacuate cavity 6 down to a pressure of $5 \times 10^{-4}$ Torr. In Example 2, where only nitrogen (N) gas was used (no plasma), it took 10.2 minutes to evacuate space/cavity 6 down to $5 \times 10^{-4}$ Torr. Finally, in Example 3 where only oxygen (O) gas was used (no plasma), it took 12.1 minutes to evacuate cavity 6 down to $5 \times 10^{-4}$ Torr.

Examples 4–6 were carried out in accordance with different embodiments of the instant invention. In other words, plasma 41 was ignited in cavity 6 in each of Examples 4–6. Steps taken in Examples 4–6 are shown in FIGS. 5–8.

Examples 4–6 were performed in identical manners, except that argon (Ar) gas was used in Example 4, nitrogen (N) gas in Example 5, and oxygen (O) gas in Example 6. Plasma excitation/ignition was present in each of Examples 4–6. Referring to FIGS. 3 and 5–6, pump 27 was first operated for about two minutes in order to lower the pressure in cavity 6 to about 0.01 Torr (see step 51 in FIG. 5). Then, in a first gas purge (see purge one in FIG. 6), gas from source 21 was pumped via pump 27 and tube 8 into cavity 6 until the pressure therein was raised to about 10 Torr at the two minute mark in FIG. 6 (step 53 in FIG. 5). Following step 53, plasma 41 was ignited in gas inclusive cavity 6 using a tesla coil 31 (step 55 in FIG. 5). The particular tesla coil used emits about 50,000 volts at full power, which is what was used for Examples 4–6. Thereafter, at about the two and one-half minute mark (see FIG. 6), coil 31 was moved across the vacuum IG unit (i.e., the coil was moved over cavity 6), and then at about the three minute mark (see FIG. 6) pump 27 was again turned on in an evacuating manner (step 57 in FIG. 5). Continuing with moving of coil 31, the coil was moved to approximately the center of the vacuum IG unit at about the three and one-half minute mark (see FIG. 6). Pumping out continued from the three minute mark until about the six minute mark (see FIG. 6). However, at the five minute mark, the coil 31 was removed and a spirotorr rotor gauge tube was attached to the vacuum IG unit in order to monitor internal pressure. (Step 59 in FIG. 5). As shown in FIG. 6, after the coil 31 was removed, pumping continued until the six minute mark (step 61 in FIG. 5). Them, at the six minute mark, gas from source 21 was again pumped into cavity 6 in a second purge (see FIG. 6 and step 63 in FIG. 5). Following this optional second gas purge shown in FIG. 6, pump 27 was switched back to an evacuating state so as to evacuate cavity 6 down to the pressures shown in FIGS. 7–8 via a turbo-pump (with or without plasma 41 ignition in the cavity 6).

Referring to FIGS. 7–8, in Example 4 where plasma ignition was combined with argon (Ar) gas, it took 9.3 minutes to evacuate cavity 6 down to a pressure of $5 \times 10^{-4}$ Torr. This is almost five minutes less than with argon (Ar) gas not excited with plasma (compare Example 4 to Example 1). In a similar manner, in Example 5 where nitrogen (N) gas was combined with plasma ignition, it took only 6.1 minutes to evacuate cavity 6 down to a pressure of $5 \times 10^{-4}$ Torr. This is almost four minutes less than with nitrogen gas and no plasma (compare Example 5 to Example 2). Finally, in Example 6 where oxygen (O) gas was combined with plasma ignition, it took only 8.2 minutes to evacuate cavity 6 down to a pressure of $5 \times 10^{-4}$ Torr. This is almost four minutes less than with oxygen gas and no plasma (compare Example 6 to Example 3). Clearly, it can be seen from the above that the ignition of plasma 41 in cavity 6 during the evacuation process significantly reduces the time needed to evacuate the cavity 6 down to a desired low pressure. The 34% improvement for argon gas, 40% improvement for nitrogen gas, and 32% improvement for oxygen gas (with plasma ignition) are shown at the bottom of FIG. 8.

In Examples 4–6, in step 57 where coil 31 was moved across the IG unit, the coil started at the corner of the unit furthest from pump-out tube 8, and moved diagonally across the unit toward the same. This method of movement is provided for purposes of example only and is not intended to be limiting. In fact, coil 31 may or may not be moved across the IG unit in different embodiments of this invention, during the evacuation process.

It can be seen from the above that the use of nitrogen gas (as opposed to argon or oxygen) when combined with plasma ignition results in superior time reduction of the evacuation process (i.e., a lower pressure is achievable more quickly). In this regard, FIG. 8 shows that the use of nitrogen gas instead of oxygen or argon reduces the evacuation time by some 2–3 minutes. This is believed to be a result of the fact that nitrogen has the highest conductance value (followed by oxygen and argon) and a higher molecular mass. However, those skilled in the art will realize that any of these gases may be used in different embodiments of this invention even though the data shows nitrogen to be superior with regard to reduction of evacuation time.

The embodiments discussed above illustrate coil 31 (e.g., tesla coil) as the structure for inductively igniting plasma 41 within cavity 6. However, the instant invention is not limiting in this regard. For example, other techniques for causing a plasma to be ignited with cavity 6 include electron cyclotron resonance (ECR) for generating a high density plasma, neutral-looped discharge (NLD) for generating plasma by RF fields, or the like. In essence, while it is important that a plasma 41 be ignited within cavity 6, various structures/techniques may be utilized in different embodiments of this invention to ignite such a plasma.

Once given the above disclose, many other features, modifications, and improvements will become apparent to the skilled artisan. Such other features, modifications, and improvements are therefor considered to be a part of this invention, the scope of which is to be determined by the following claims and their respective equivalents.

What is claimed is:

1. A method of making a thermally insulating panel, the method comprising:
   providing a plurality of spacers between first and second substrates in order to space the substrates from one another;
   forming a seal located at least partially between the substrates so as to seal off a space between the substrates; and
   causing a plasma to be present in at least a portion of the space between the substrates during a process of evacuating the space.

2. The method claim 1, wherein said first and second substrates each comprise glass.

3. The method of claim 1, wherein said causing a plasma to be present in at least a portion of the space comprises igniting a plasma in at least a portion of the space by positioning a coil outside of the space and applying electric current to the coil so that the coil generates electromagnetic waves which pass through the first substrate and ignite the plasma in at least a portion of the space.

4. The method claim 3, wherein the coil comprises a tesla coil.

5. The method of claim 1, wherein the plasma is ignited in the space in an inductive manner.

6. The method of claim 1, further comprising pumping a gas into the space and thereafter igniting the plasma, so that said igniting causes the plasma to be ignited by at least partially ionizing the gas in the space.

7. The method of claim 6, wherein the gas comprises at least one of nitrogen, argon, and oxygen.

8. The method of claim 7, wherein the gas comprises nitrogen.

9. The method of claim 1, wherein said evacuating causes the space to be evacuated down to a pressure of about $5 \times 10^{-4}$ Torr or less.

10. The method of claim 1, wherein the seal is an edge seal comprising solder glass.

11. A method of making a thermally insulating window, the method comprising:
    igniting a plasma in at least part of a space between opposing substrates that are spaced from one another by a plurality of spacers; and
    evacuating the space to form the thermally insulating window.

12. The method of claim 11, wherein said igniting comprises inductively igniting the plasma using a coil positioned outside of the space, and wherein said igniting takes place either before or during said evacuating.

13. The method of claim 11, wherein said evacuating comprises evacuating the space down to a pressure below about $10^{-2}$ Torr.

14. The method of claim 13, wherein said evacuating comprises evacuating the space down to a pressure below about $10^{-3}$ Torr.

15. The method of claim 14, wherein said evacuating comprises evacuating the space down to a pressure of about $5 \times 10^{-4}$ Torr or less.

16. The method of claim 11, further comprising forming a hermetic edge seal comprising solder glass between the substrates in order to define a periphery of the space to be evacuated.

17. A method of making a thermally insulating window, the method comprising pumping-out or evacuating a space between opposing substrates while a plasma is present in at least part of the space.

18. The method of claim 17, further comprising providing a plurality of spacers between the opposing substrates in order to space the substrates from one another and form the space between the substrates.

19. The method of claim 18, further comprising forming an edge seal between the substrates to define a periphery of the space.

20. The method of claim 17, further comprising igniting the plasma in the space using a coil positioned outside of the space.

21. The method of claim 17, wherein said evacuating is conducted when the plasma is present in the space, and is also conducted after the plasma has expired and is no longer present in the space.

22. The method of claim 21, wherein said evacuating comprises evacuating the space down to a pressure below about $10^{-3}$ Torr.

23. A method of making a thermally insulating window, the method comprising:
    igniting a plasma in at least part of a space between opposing substrates that are spaced from one another by at least one spacer; and
    evacuating the space to form the thermally insulating window.

24. The method of claim 23, wherein said igniting comprises inductively igniting the plasma using a coil positioned outside of the space, and wherein said igniting takes place either before or during said evacuating.

25. A method of making a thermally insulating panel, the method comprising:
    spacing first and second substrates from one another;
    forming a seal located at least partially between the substrates so as to seal off a space between the substrates; and causing a plasma to be present in at least a portion of the space between the substrates during a process of evacuating the space.

26. The method of claim 25, wherein said causing a plasma to be present in at least a portion of the space comprises igniting a plasma in at least a portion of the space by positioning a coil outside of the space and applying electric current to the coil so that the coil generates electromagnetic waves which pass through at least the first substrate and ignite the plasma in at least a portion of the space.

27. The method claim 26, wherein the coil comprises a tesla coil.

28. The method of claim 25, wherein the plasma is ignited in the space in an inductive manner.

\* \* \* \* \*